Figure 1:
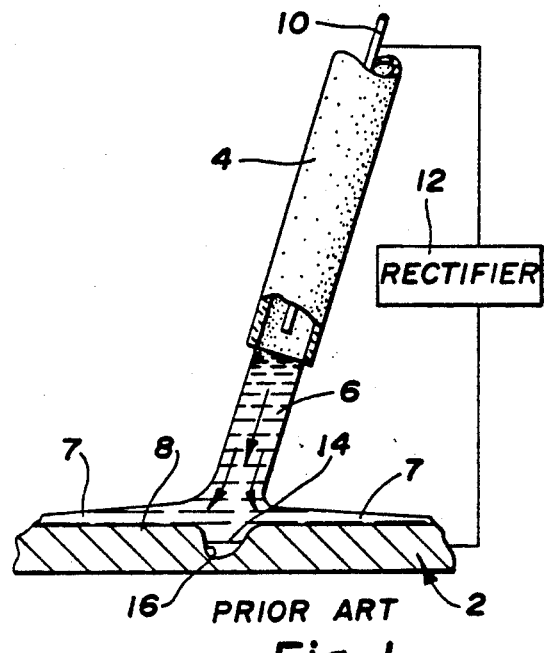

United States Patent [19]
Nyberg

[11] Patent Number: 5,034,106
[45] Date of Patent: Jul. 23, 1991

[54] ELECTROLYTIC DRILLING

[75] Inventor: Glen A. Nyberg, Warren, Mich.

[73] Assignee: General Motors Corporation, Detroit, Mich.

[21] Appl. No.: 568,117

[22] Filed: Aug. 16, 1990

[51] Int. Cl.$^5$ ............................................. B23H 9/14
[52] U.S. Cl. .......................... 204/129.2; 204/129.55; 204/129.7; 204/129.6; 204/224 M
[58] Field of Search ............. 204/129.55, 129.6, 129.7, 204/129.2, 224 M

[56] References Cited
U.S. PATENT DOCUMENTS

| | | | |
|---|---|---|---|
| 2,741,594 | 4/1956 | Bowersett | 204/224 M X |
| 3,384,563 | 5/1968 | Taylor | 204/129.7 X |
| 3,749,654 | 7/1973 | Mikulski | 204/224 M X |
| 3,849,271 | 11/1974 | Joslin | 204/129.2 |
| 3,990,959 | 11/1976 | Payne et al. | 204/129.55 |

Primary Examiner—Donald R. Valentine
Attorney, Agent, or Firm—Lawrence B. Plant

[57] ABSTRACT

Method of electrolytic drilling of a fluid metering orifice through a metal substrate including the step of terminating electrolytic current flow when the volume of the electrolyte stream impinging on the substrate correlates to the desired flow of the fluid through the orifice.

5 Claims, 1 Drawing Sheet

ELECTROLYTIC DRILLING

This invention relates to electrolytically drilling orifices in metal substrates and more particularly to controlling the size of electrolytically drilled fluid metering orifices to insure delivery of precise quantities of fluid under predetermined pressure conditions.

BACKGROUND OF THE INVENTION

A number of devices utilize small orifices to meter or control the flow of fluids therethrough. For example, some turbine engine parts are made from a material which includes a plurality of small holes therethrough and through which gases flow for transpirational cooling of the parts. Moreover, some fuel injectors for supplying precise quantities of fuel to internal combustions engines use an orifice plate for atomizing fuel injected into the combustion chamber of the engine. Such plates typically comprise a thin (0.004 in.) stainless steel disc having a number of small, diverging orifices extending through the disc. One such injector has six orifices (i.e., 0.006 in. diameter) angling through the disc at an angle of about 30° to the principal plane of the disc so as to provide a fuel flow of about 2 g/sec in a cone-shaped pattern. This flow should not vary more than about one percent from one injector to the next.

Fuel injector orifices are currently made using electric discharge machining (EDM) techniques in which an electrical spark between a fine wire and the orifice plate selectively vaporizes metal from the disc to form the orifice. EDM machines are quite costly and typically machine only one orifice at a time. Moreover, in order to obtain a desired fuel flow rate through the orifice it is necessary to control a number of process variables other than flow rate to insure the requisite one percent variability allowance. In this regard, fuel flow rate through the disc is affected by a variety of geometrical parameters of the orifices in the orifice plate (i.e., diameter, length, taper, roundness, surface finish and presence of burrs). These geometrical parameters are, in turn, affected by the EDM process parameters (i.e., voltage, current, frequency, electrode gap, ramming speed, electrode type, physical metallurgy of the workpiece and the dielectric fluid's properties). With all these variables to consider it is extremely difficult to control the EDM process to keep it within the narrow window of allowable flow rate variation.

Electrolytic jet drilling has been used to drill metal substrates by passing electrolyzing current through an uncontained stream of electrolyte impinging on the surface of the metal to be drilled. While electrolyte splashes off and spreads over much of the surface of the substrate, drilling occurs substantially exclusively at the impingement site as is well know in the art. Such electrolytic drilling processes are known to make burr-free surfaces, but are incapable of accurately machining fuel injector sized orifices within a diameter tolerance of only 0.5 percent (i.e., one percent tolerance on flow equals a one percent tolerance on area and hence a 0.5 percent tolerance on orifice diameter).

It would be desirable if a process could be devised which would consistently and simply drill small, precisely sized fluid metering orifices with minimum fluid flow rate variability from one orifice to the next. It would even be more desirable if a process could be devised for simultaneously drilling a plurality of such orifices.

It is a principal object of the present invention to provide a process for the consistent electrolytic drilling of small orifices with little flow rate variability from one orifice to the next which process includes real time measurement of the flow rate through the orifice during drilling. It is a further object of the present invention to provide such a process for simultaneously electrolytically drilling a plurality of such orifices. These and other objects and advantages of the present invention will become more readily apparent from the detailed description thereof which follows and which is given hereafter in conjunction with several drawings in which:

THE INVENTION

Figure 2A:
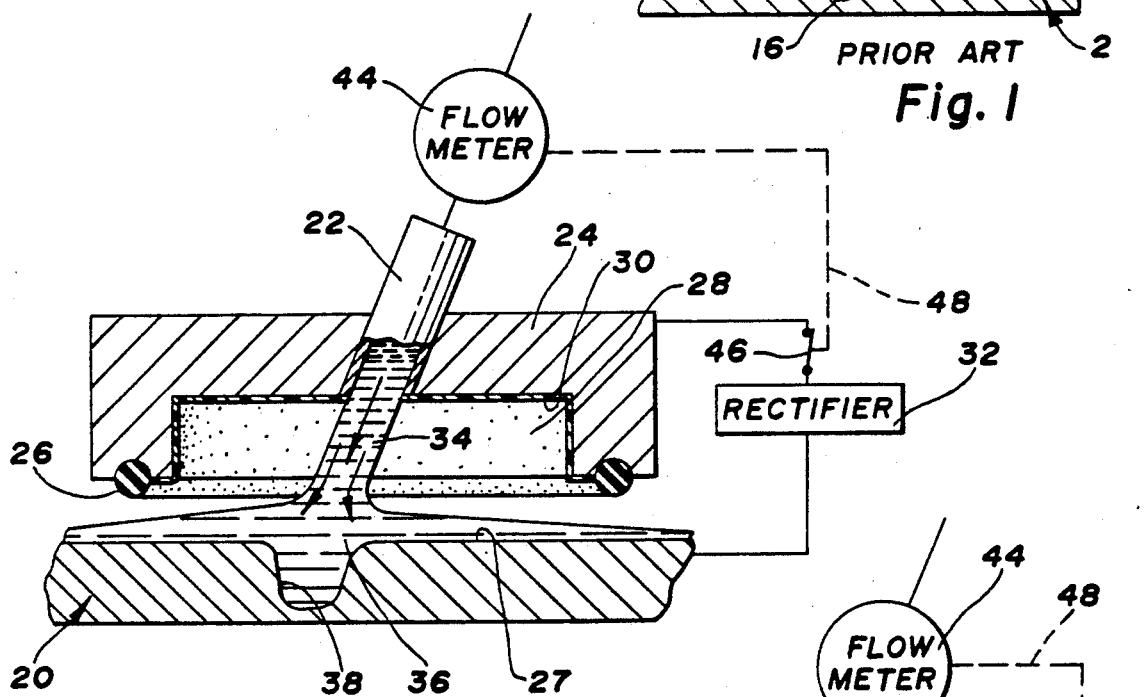
Figure 2B:
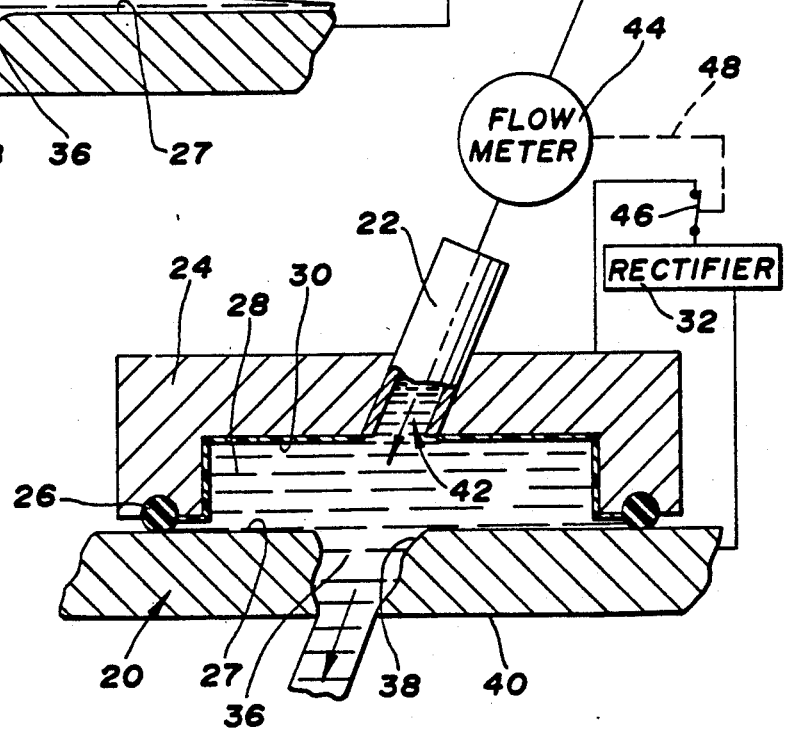

FIG. 1 illustrates a partially broken away, sectioned, side view of the prior art method for the electrolytic, jet drilling of orifices in metal substrates; and FIGS. 2a and 2b are partially broken away, sectioned, side views of the method in accordance with the present invention showing the process before and after electrolyte has perforated the substrate.

As illustrated in FIG. 1, the prior art electrolytic drilling process involves a metallic substrate 2, a glass nozzle 4 for directing a stream of electrolyte 6 onto the face 8 of the substrate 2. A metal wire 10 extends down through the center of the nozzle 4 and serves as a counterelectrode. An electrical potential is impressed between the substrate 2 and the counterelectrode wire 10 by any convenient means 12 (e.g., battery, generator rectifier, etc.) sufficient to cause electrolyzing current to flow therebetween and such that the substrate 2 is rendered anodic with respect to the counterelectrode 10. Under this arrangement, current flows between the substrate 2 and the wire 10 through the stream of electrolyte 6 and selectively electrolytically erodes the substrate 2 at the point of impingement 14 of the stream 6 on the face 8 with consequent drilling of the hole 16 into the substrate 2. Spent electrolyte 7 splashes off or flows away from the impingement site 14 along the face 8 of the substrate 2. Such a technique has the capability of drilling orifices having diameters as much as about one and a half (1½) times the diameter of the stream 6 but cannot be controlled so as to consistently drill small apertures within the required 0.5% diameter tolerance.

FIGS. 2a and 2b depict the present invention wherein precisely sized (i.e., fluid flow wire) orifices are electrolytically drilled through a metal substrate via a two-stage process. More specifically, FIGS. 2a and 2b show a metal substrate 20, a metal electrolyte nozzle 22 carried by a housing 24 defining a chamber 28 and having an elastomeric seal 26 on the underside thereof for engaging the substrate 20. In the embodiment shown in the Figures, the housing 24 comprises metal and has an insulating coating 30 on the inside surface thereof. In the embodiment depicted, the nozzle 22 is electrically conductive and the electrical potential between the nozzle 22 and the substrate 20 can readily be provided by electrically coupling the metal housing 24 directly to the substrate 20 via a means 32 for impressing the requisite potential between the substrate 20 and the electrode 22. If desired, the nozzle may conveniently be made by simply drilling an appropriately sized and angled hole through the housing 24 and connecting the hole to an electrolyte supply tube externally of the housing 24. Alternatively, the housing 24 may comprise a non-conductive material, e.g., plastic or hard rubber. If so, a glass tube and wire like that shown in FIG. 1 may be used therewith along with appropriate electrical coupling ala FIGS. 1. As in the case of the prior art shown in FIG. 1, an electrolyte 34, appropriate to the metal being drilled, is directed by the nozzle 22 so as to impinge on the substrate 20 at the site 36. Passage of current between the substrate 20 and nozzle 22 causes electrolytic erosion of the substrate 20 at the impingement site 36 and formation of the orifice 38 thereat. Surface passivating electrolytes, such as aqueous sodium chlorate, will preferably be used to help prevent any stray metal removal from the face of the substrate. Up to this point the process is essentially the same as described in conjunction with FIG. 1.

After the orifice 38 has broken through the underside 40 of the substrate 20 (see FIG. 2b), the housing 24 is moved toward the substrate 20 so as to press the elastomeric seal 26 against the face 27 of the substrate 20 surrounding the orifice 38 and such that the chamber 28 is effectively sealed completely closed except for the inlet thereto (i.e., nozzle 22) and the outlet therefrom (i.e., orifice 38). Sealing off the region around the orifice 38 may occur at any time after the orifice breaks through the substrate, but will preferably not occur until about 90% of the orifice's finished size is achieved, using conventioanl electrolytic jet drilling. After the chamber 28 has been sealed against the substrate, all of the electrolyte flowing through the nozzle 22 is confined to the chamber 28 except that which exits through the orifice 38. A flow meter 44 installed upstream of the nozzle 22 measures the flow rate of electrolyte through the nozzle 22 which is controlled by the size of the ever-enlarging orifice 38. Hence at constant electrolyte pressure provided by the electrolyte pump (not shown), the electrolyte flow rate will gradually increase as the size of the orifice 38 increases. When the electrolyte flow measured by meter 44 reaches a predetermined level indicative of the desired size of the orifice 38, electrolyzing current flow is terminated and further enlargement of the orifice 38 stopped. Preferably, termination of the electrolyzing current flow will be controlled automatically by control means 48 which opens a switch 46 in response to a signal from flow meter 44 when a predetermined control point is reached. Alternatively, the pressure of the electrolyte in chamber 28 can be monitored and cessation of current flow triggered when the pressure in the chamber 28 falls to a desired control point previously correlated to the desired electrolyte flow rate through the orifice 38.

The insulating coating 30 on the inside of the housing 24 services to confine current flow to the region immediately opposite the end 42 of the nozzle 22 (i.e., the hole 38). Moreover, it may be desirable in some instances to selectively mask the substrate so as to leave exposed only the areas on the face 27 where the orifices 38 are to be machined.

In order to determine the control point for the meter 44 and insure that the orifice is the proper size for the particular fluid flow sought to be metered, it is necessary only to correlate the flow rate of the electrolyte solution at the electrolytic drilling system's pressure to that of the desired fluid at the pressure where it is to be controlled. Hence for example in the case of a fuel injector orifice plate, the following procedure may be followed to correlate the two flows:

1. Determine the flow rate (grams per second) of fuel required to be passed through the orifice plate at the design pressure of the fuel injector;

2. In a test fixture, subject the fuel to the aforesaid design pressure and pass it through several orifices of varying sizes to determined which size delivers the desired flow rate;

3. In the same test fixture and using the orifice size determined from in the previous step, subject the selected electrolyte solution to the operating pressure of the electrolytic drilling system and measure the flow rate of the electrolyte through the orifice (hereafter reference flow rate); and 4. Use the reference flow rate determined in the previous step as the electrolyte flow control point for terminating the current flow as described above.

While the invention has been disclosed primarily in terms of a specific embodiment thereof it is not intended to be limited thereto but rather only to the extent set forth hereafter in the claims which follows.

The embodiments of the invention in which an exclusive property or privilege is claimed are defined as follows:

1. A method for machining a first orifice of a desired size through a metal substrate for metering a desired flow of a selected fluid therethrough comprising the steps of:
   a. preparing an electrolyte solution suitable to the electrolytic erosion of said metal;
   b. correlating said flow of said fluid through a second orifice to the flow of said solution through said second orifice to establish a reference flow of said solution, said second orifice being the same size as said first orifice;
   c. impinging a stream of said solution from a nozzle onto a site of said substrate while passing electrical current between said substrate and a counterelectrode contacting said solution so as to render said substrate anodic with respect to said counterelectrode, said potential being sufficient to selectively electrolytically erode and perforate said substrate at said site;
   d. after said substrate has been perforated, sealing a housing against said surface surrounding said site, said housing defining a chamber confronting said site;
   e. filling said chamber with said solution from said nozzle while allowing a portion of said solution to pass out of said chamber via the perforation formed at said site; and
   f. discontinuing said current flow when the flow of said solution through said nozzle reaches said reference flow.

2. A method for consistently accurately machining at least one small fluid-metering orifice through a metal substrate, said orifice having a size adapted to provide a selected flow rate of said fluid through said orifice at a given operating pressure comprising the steps of:
   a. preparing an electrolyte solution suitable to the electrolytic erosion of said metal;
   b. correlating the flow rate of said solution to that of said fluid through an orifice having said size to thereby establish a reference flow rate of said solution through said orifice;
   c. impinging a stream of said solution from a nozzle onto a site of said substrate while passing electrical current between said substrate and a counterelectrode contacting said solution so as to render said substrate anodic with respect to said counterelectrode, said potential being sufficient to selectively electrolytically erode and perforate said substrate at said site;

d. after said substrate has been perforated sealing a housing against said surface surrounding said site, said housing defining a chamber confronting said site;

e. filling said chamber with said solution from said nozzle while allowing a portion of said solution to pass through the perforation formed at said site; and f. discontinuing said current flow when the solution flow rate through said nozzle equals said reference flow rate.

3. The method according to claim 2 including the step of measuring the flow rate of said solution through said nozzle to determine when said reference flow rate has been reached.

4. The method according to claim 2 including the step of measuring the pressure in said chamber to determine when said reference flow rate has been reached.

5. The method according to claim 2 wherein a number of said fluid-metering orifices are simultaneously machined into said substrate.

* * * * *